United States Patent
Kawai

(10) Patent No.: US 11,434,093 B2
(45) Date of Patent: Sep. 6, 2022

(54) IMAGE INSPECTION APPARATUS

(71) Applicant: RISO KAGAKU CORPORATION, Tokyo (JP)

(72) Inventor: Muneaki Kawai, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 411 days.

(21) Appl. No.: 16/711,891

(22) Filed: Dec. 12, 2019

(65) Prior Publication Data

US 2020/0189867 A1    Jun. 18, 2020

(30) Foreign Application Priority Data

Dec. 18, 2018 (JP) .............................. JP2018-236529
Nov. 26, 2019 (JP) .............................. JP2019-213232

(51) Int. Cl.
*B41J 29/393* (2006.01)
*B41J 11/00* (2006.01)
(Continued)

(52) U.S. Cl.
CPC ........... *B65H 7/02* (2013.01); *B41F 33/0036* (2013.01); *B41J 11/007* (2013.01);
(Continued)

(58) Field of Classification Search
CPC ... B65H 7/02; B65H 2511/11; B41F 33/0036; B41J 11/007; B41J 11/0085;
(Continued)

(56) References Cited

U.S. PATENT DOCUMENTS

2009/0121065 A1* 5/2009 Sato ..................... B65H 23/038
                                                        242/364.11
2016/0366296 A1* 12/2016 Isokawa ............. G03G 15/5029
(Continued)

FOREIGN PATENT DOCUMENTS

JP    2015-78899 A    4/2015
JP    2018-31963 A    3/2018

OTHER PUBLICATIONS

Jun. 3, 2020 Extended European Search Report in European Application No. 19217094.2.

*Primary Examiner* — Henok D Legesse
(74) *Attorney, Agent, or Firm* — Greenblum & Bernstein P.L.C.

(57) ABSTRACT

An image inspection apparatus is capable of inspecting an image on a print sheet as an inspection object with high accuracy while conveying the print sheet from an upstream conveyance unit to a downstream conveyance unit. The image inspection apparatus inspects the print sheet conveyed at a first conveyance speed with a first conveyance unit of a printing device, with a first inspection unit, while conveying the print sheet at a second conveyance speed with a second conveyance unit of an inspection device. The first inspection unit is provided in a position downstream of an intermediate position between the first conveyance unit and the second conveyance unit by a length longer than a half of the length of the print sheet. Even when the first conveyance speed and the second conveyance speed are not substantially the same, no disorder occurs in the image read with the first inspection unit.

7 Claims, 15 Drawing Sheets

(51) Int. Cl.
    *B65H 7/02*          (2006.01)
    *G03G 15/00*       (2006.01)
    *B41F 33/00*        (2006.01)
    *H04N 1/00*         (2006.01)
    *B41J 13/00*        (2006.01)

(52) U.S. Cl.
    CPC ....... *B41J 11/0085* (2013.01); *B41J 13/0036* (2013.01); *B41J 29/393* (2013.01); *G03G 15/5062* (2013.01); *H04N 1/00795* (2013.01); *B41J 2203/01* (2020.08); *B65H 2511/11* (2013.01)

(58) Field of Classification Search
    CPC .. B41J 13/0036; B41J 29/393; B41J 2203/01; G03G 15/5062; H04N 1/00795
    See application file for complete search history.

(56) References Cited

U.S. PATENT DOCUMENTS

| | | | |
|---|---|---|---|
| 2017/0232758 A1* | 8/2017 | Inagawa | ............ B41J 2/04536 347/15 |
| 2018/0059603 A1 | 3/2018 | Miyahara | |
| 2019/0312982 A1* | 10/2019 | Isokawa | ............ H04N 1/00652 |

* cited by examiner

PAPER BEHAVIOR WHEN V1 < V2 HOLDS

PAPER BEHAVIOR WHEN V1 < V2 HOLDS

PAPER BEHAVIOR WHEN V1<V2 HOLDS

FIG. 10A  *RELATED ART*
PAPER BEHAVIOR WHEN V1<V2 HOLDS
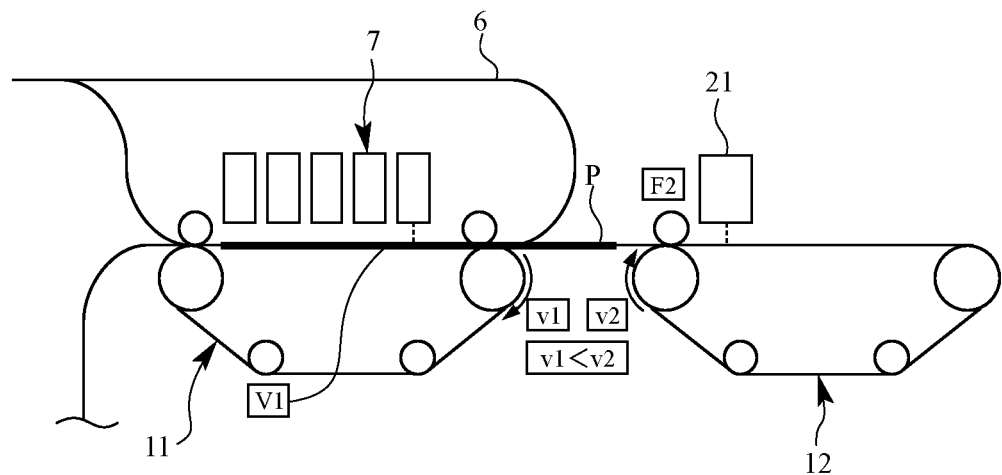
FIG. 10B  *RELATED ART*
PAPER BEHAVIOR WHEN V1<V2 HOLDS
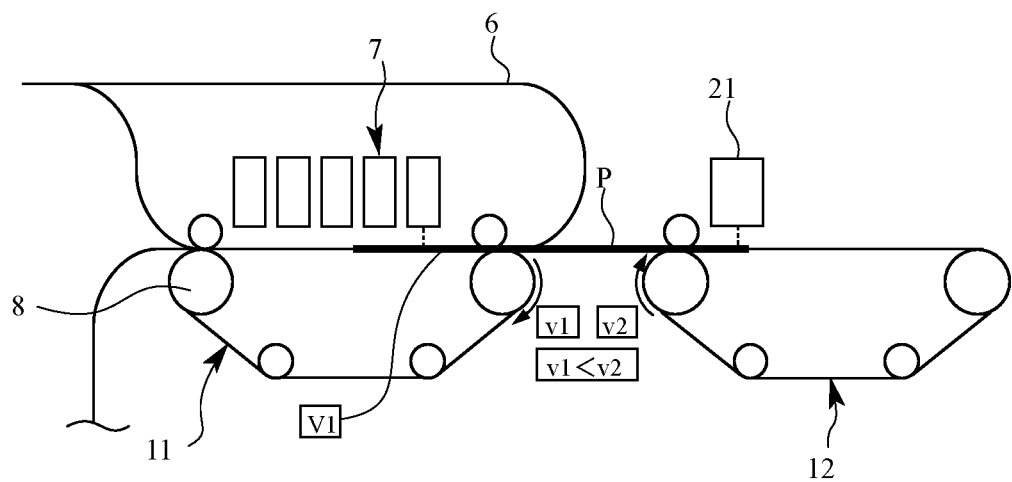

FIG. 10C  *RELATED ART*
PAPER BEHAVIOR WHEN V1 < V2 HOLDS
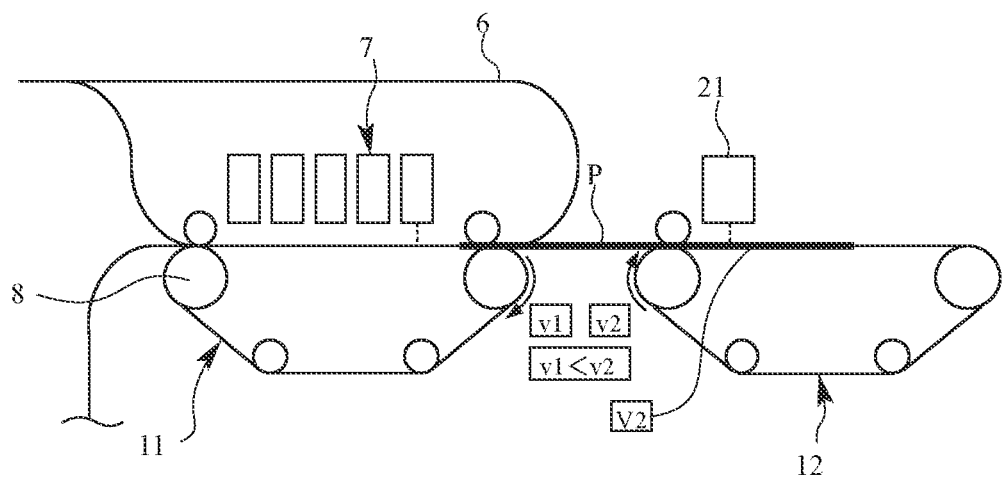

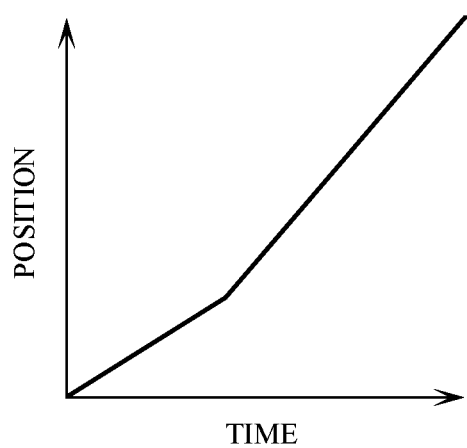
FIG. 11  *RELATED ART*

FIG. 12A  *RELATED ART*
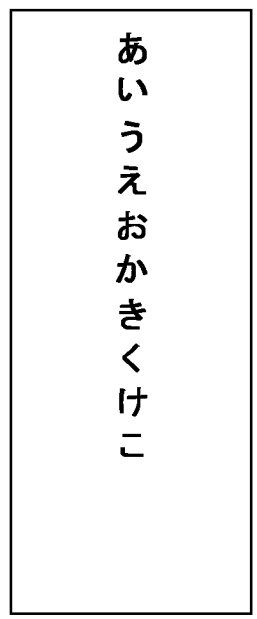
FIG. 12B  *RELATED ART*
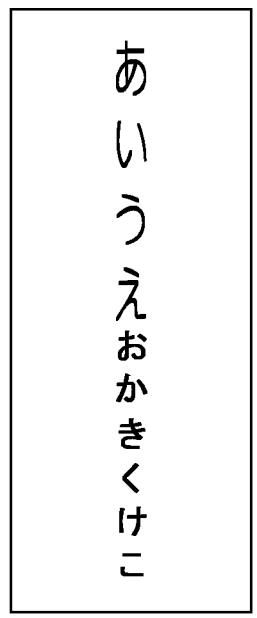

IMAGE INSPECTION APPARATUS

BACKGROUND OF THE INVENTION

The present invention relates to an image inspection apparatus which inspects an image formed on a sheet-type inspection object, and more particularly, to an image inspection apparatus capable of inspecting an image formed on an inspection object conveyed from an upstream-side conveyance unit while transferring the inspection object with a downstream-side conveyance unit, with high accuracy.

Japanese Published Unexamined Patent Application No. 2018-31963 discloses an invention of an image forming apparatus. As shown in FIG. 1 of the patent literature, the image forming apparatus has a camera unit 230 for image inspection. The camera unit 230 is provided with a sheet conveyance path 223 to convey a sheet from upstream toward downstream while holding the sheet with rollers. Two cameras 231 and 232 are oppositely provided in the same position on and under the sheet conveyance path 223. In the camera unit 230, the sheet is conveyed in one direction along the sheet conveyance path 223, while the two cameras 231 and 232 read respective images on the upper and lower surfaces of the conveyed sheet. A sheet inspection device 150 uses the obtained images of the sheet sent from the camera unit 230 to inspect the images printed on the sheet.

CITATION LIST

Patent Literatures

{Patent Literature 1} Japanese Patent Application Laid-Open No. 2018-31963

DESCRIPTION OF RELATED ART

Technical Problem

In the image forming apparatus disclosed in Japanese Published Unexamined Patent Application No. 2018-31963, the camera unit is provided with a roller conveyance unit, as a sheet conveyance unit, in which the pair of rollers to hold the sheet from positions above and below the sheet is provided at a predetermined interval. The camera unit performs image sensing on images of the sheet between the pairs of rollers. Accordingly, since there is no member to hold and guide the sheet between the pairs of rollers, the position of the sheet conveyed at a high speed is not stable. In some cases, the position of the sheet changes in a direction vertical to the paper surface. When the camera unit is an image sensing device having a shallow depth of focus such as a CIS (Contact Image Sensor), it is impossible to perform image reading when the sheet moves in a focal depth direction.

As shown in FIG. 9, the present inventors have invented an image inspection apparatus which inspects images of a print sheet with camera(s) while conveying the print sheet with a suction type conveyance unit. The image inspection apparatus 1a has a printing device 2, an inspection device 3a, and a post-processing device 4, sequentially provided along the print-sheet moving direction.

The printing device 2 has plural storage parts 5 which hold plural types of print sheets, a loop-shaped conveyance passage 6 which is connected to the storage parts 5, and which is capable of conveying the print sheet twice in the same passage while turning over the print sheet by reversing the print sheet, a first conveyance unit 11 which is provided in a part of the conveyance passage 6, and which sucks and conveys the print sheet the print sheet, and a printing unit 7 which is provided above the first conveyance unit 11, and which discharges ink to form an image on the print sheet conveyed with the first conveyance unit 11. The first conveyance unit 11 has a belt conveyer 8 having a belt, in which a large number of holes are formed, put around plural rollers, and an unshown suction unit, provided on the lower surface side of the belt conveyer 8, to suck the print sheet on the upper surface side of the belt. The first conveyance unit 11 sucks the print sheet on the upper surface side of the belt with the suction unit, and conveys the print sheet by moving the belt. For the sake of convenience, the exposed surface of the print sheet conveyed with the first conveyance unit 11 will be referred to as a front surface, and the opposite side, as a rear surface.

The inspection device 3a has a second conveyance unit 12 which is connected to the first conveyance unit 11 of the previous-stage printing device 2, and which sucks and conveys the print sheet, with the front surface exposed on the upper side, and a first inspection unit 21 which is provided in a downward posture above the second conveyance unit 12 on the upstream side, and which inspects the image on the front surface of the print sheet. The configuration of the second conveyance unit 12 is approximately the same as the configuration of the first conveyance unit 11. Further, on the downstream side of the second conveyance unit 12, a third conveyance unit 13 which sucks and conveys the print sheet sent from the previously-stage second conveyance unit 12, with the rear surface exposed to the lower side, and a second inspection unit 22, which is provided in an upward posture below the third conveyance unit 13 on the upstream side, and which inspects the image on the rear surface of the print sheet are provided. The configuration of the third conveyance unit 13 is approximately the same as the configuration of the first conveyance unit 11 and the second conveyance unit 12. However, the third conveyance unit 13 is provided in an upside-down posture.

The post-processing device 4 is a device to receive the print sheet, having the images on the front and rear surfaces inspected with the inspection device 3a, perform various necessary post-processing on the print sheet, and discharge it as a final product.

According to the image inspection apparatus 1a, a first conveyance speed V1 of the first conveyance unit 11 in the printing device 2 and a second conveyance speed V2 of the second conveyance unit 12 in the inspection device 3a are controlled so as to be substantially the same. When the control is properly performed, no problem occurs in the inspection of the image on the print sheet with the first inspection unit 21 of the inspection device 3a.

However, in a state where the first conveyance speed V1 and the second conveyance speed V2 are not substantially the same, when inspecting the image on the print sheet with the first inspection unit 21 of the inspection device 3a, a problem occurs in image reading as described below with reference to FIGS. 10A to 10C. FIGS. 10A to 10C continuously show a state of inspection performed with the first inspection unit 21 on the print sheet, sent from the first conveyance unit 11 to the second conveyance unit 12, when the second conveyance speed V2 is higher than the first conveyance speed V1 (when the conveyance speed on the downstream side is higher than the conveyance speed on the upstream side).

FIG. 10A shows a state of image formation with the printing unit 7 on the print sheet P being sucked and conveyed with the first conveyance unit 11. The front end of the print sheet P has not reached the second conveyance unit 12. The print sheet P is conveyed at the first conveyance speed V1 (<second conveyance speed V2).

FIG. 10B shows a state of the image formation with the printing unit 7 at the rear end of the print sheet P being conveyed with the first conveyance unit 11 and the second conveyance unit 12. The front end of the print sheet P has already reached the second conveyance unit 12. Image inspection is started with the first inspection unit 21 while a conveyance force with the second conveyance unit 12 is applied to the print sheet. Since the part sucked and conveyed with the first conveyance unit 11 is longer than the part sucked and conveyed with the second conveyance unit 12, the print sheet P is conveyed at the first conveyance speed V1 (<second conveyance speed V2).

FIG. 10C shows a state of the image inspection with the first inspection unit 21 on the print sheet P being conveyed with the first conveyance unit 11 and the second conveyance unit 12 after the completion of the image formation with the printing unit 7. In the print sheet P, the part sucked and conveyed with the second conveyance unit 12 is longer than the part sucked and conveyed with the first conveyance unit 11. Accordingly, the print sheet P is conveyed at the second conveyance speed V2 (>first conveyance speed V1). That is, the conveyance speed of the print sheet P is higher.

FIG. 11 is a graph showing the behavior of the print sheet P in the image inspection shown in FIGS. 10A to 10C with the relationship between time elapsed from the start of the conveyance (horizontal axis) and the position of the print sheet P with reference to the position of the start of the conveyance (vertical axis). In the graph, the inclination of the straight line indicates the conveyance speed of the print sheet P. According to the graph, when predetermined time has elapsed since the start of the conveyance of the print sheet P and the print sheet has reached a predetermined position, the conveyance speed of the print sheet P becomes higher. That is, as described with reference to FIGS. 10A to 10C, the conveyance speed of the print sheet P increases from the first conveyance speed V1 of the first conveyance unit 11 to the second conveyance speed V2 (>first conveyance speed V1) of the second conveyance unit 12.

FIGS. 12A and 12B show an example of the image read with the first inspection unit 21 in image inspection of the print sheet P in the image inspection apparatus 1a. FIG. 12A shows the image when it is normally read. FIG. 12B shows the image read in a state as shown in FIGS. 10A to 10C and FIG. 11. The image shows hiragana letters (Japanese cursive characters) "a, i, u, e, o," and "ka, ki, ku, ke, ko" continuously and vertically arranged. In FIGS. 12A and 12B, the image is read in the direction from top to bottom with the first inspection unit 21.

In the image reading in the image inspection apparatus 1a, when the first conveyance speed V1 and the second conveyance speed V2 are substantially the same, the print sheet is conveyed at a uniform speed (V1=V2). In this case, as shown in FIG. 12A, there is no disorder in the image read with the first inspection unit 21. However, as described with reference to FIGS. 10A to 10C and FIG. 11, in a case where the conveyance speed of the print sheet P increases, when the image on the print sheet P conveyed at the relatively low first conveyance speed V1 is read, a long image relatively extended in the conveyance direction as an upper half part in FIG. 12B is obtained, then, when the image on the print sheet P conveyed at the relatively high second conveyance speed V2 is read, a short image relatively contracted in the conveyance direction as a lower half part in FIG. 12B is obtained. In this manner, when the conveyance speed of the print sheet P changes in the middle of image reading, disorder occurs in the read image, to disturb execution of proper inspection. In the above-described example, the conveyance speed of the print sheet P increases in the middle of image reading. On the other hand, when the conveyance speed decreases, the obtained image has disorder, i.e., the upper half part is short and the lower half part is long in the reading direction, oppositely to FIG. 12B.

SUMMARY OF THE INVENTION

The present invention solves the objects newly found in the invention which has been made by the present inventors in consideration of the problems of the conventional art. The present invention provides an image inspection apparatus capable of inspecting an image formed on an inspection object while conveying the inspection object from an upstream side conveyance unit to a downstream side conveyance unit.

An image inspection apparatus according to a first aspect of the present invention includes: a downstream-side second conveyance unit that conveys a sheet-type inspection object conveyed at a first conveyance speed with an upstream-side first conveyance unit, at a second conveyance speed; and an inspection unit that inspects an image formed on the inspection object conveyed with the second conveyance unit. The inspection unit is provided in a position to start inspection of the image when a conveyance speed of the inspection object has changed to the second conveyance speed.

In the image inspection apparatus according to the present invention, it is possible to perform inspection on the image on the inspection object with the inspection unit while conveying the inspection object with the upstream-side first conveyance unit and the downstream-side second conveyance unit. At this time, even when the first conveyance speed and the second conveyance speed are not substantially the same, since the timing of the start of the inspection of the image on the inspection object with the inspection unit is behind the change of the conveyance speed of the inspection object to the second conveyance speed, the conveyance speed of the inspection object during the inspection is constantly the second conveyance speed. Since the conveyance speed does not change, no disorder occurs in the image read with the inspection unit.

BRIEF DESCRIPTION OF THE DRAWINGS

FIGS. 10A to 10C are schematic cross-sectional views continuously showing the process of inspection of the image on the print sheet in the image inspection apparatus shown in FIG. 9 when the second conveyance speed of the inspection device is higher than the first conveyance speed of the printing device;

FIG. 11 is a graph showing speed change of the print sheet in inspection of the image on the print sheet in the image inspection shown in FIG. 9 when the second conveyance speed of the inspection device is higher than the first conveyance speed of the printing device;

FIG. 12A shows the image properly read on the print sheet read with the inspection unit in the image inspection device shown in FIG. 9 when the first conveyance speed of the printing device and the second conveyance speed of the inspection device are substantially the same; and FIG. 12B shows the image on the print sheet, in a disordered state, read with the inspection unit in the image inspection device shown in FIG. 9, in the cases shown in FIG. 9 and FIGS. 10A to 10C.

DETAILED DESCRIPTION OF THE PREFERRED EMBODIMENTS

A first embodiment of the present invention will be described with reference with FIG. 1 and FIGS. 3A to 3C.

Figure 1:
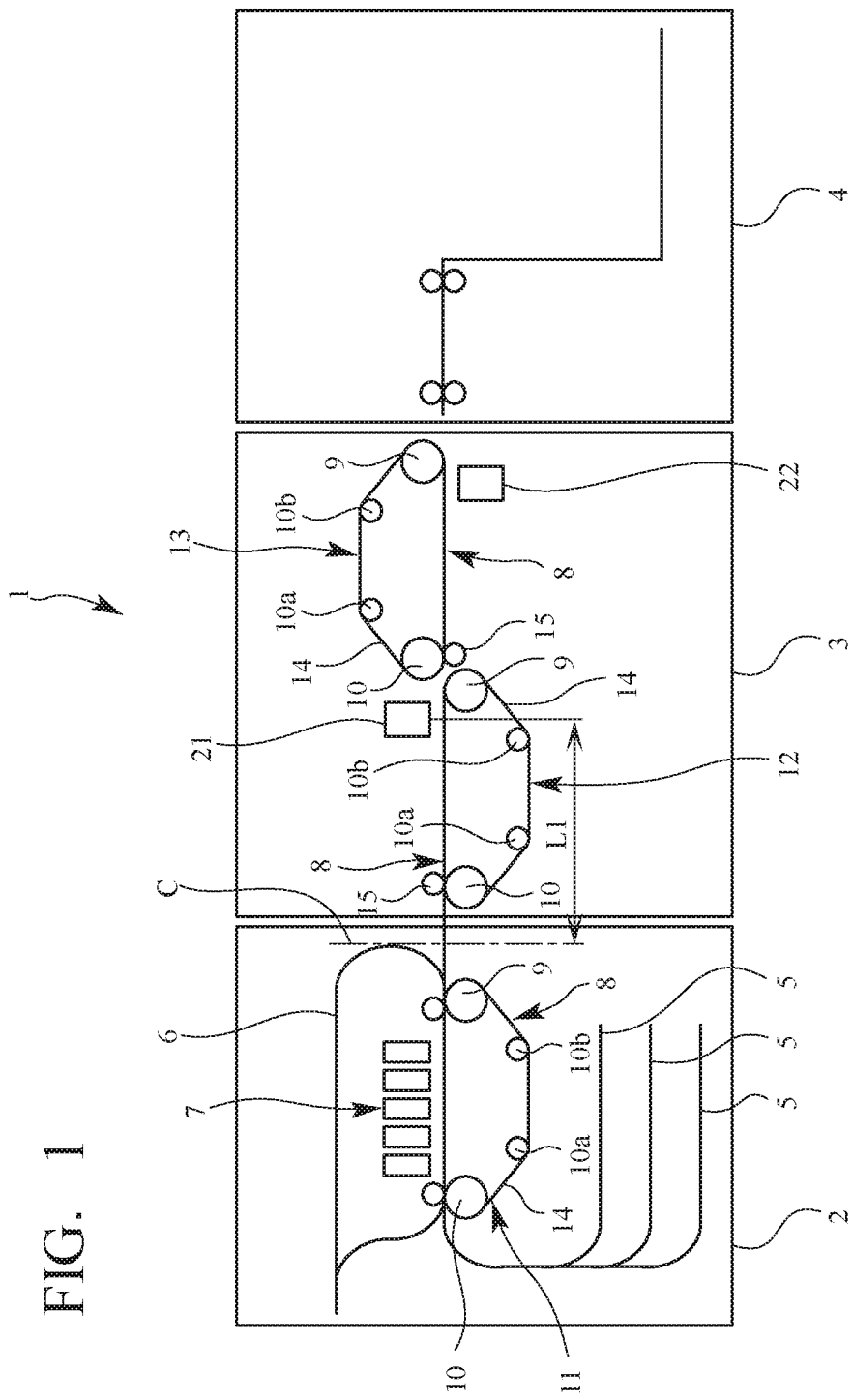
FIG. 1 is a schematic cross-sectional view showing the entire configuration of an image inspection apparatus according to a first embodiment.

As schematically shown in FIG. 1, an image inspection apparatus 1 has the printing device 2, the inspection device 3, and the post-processing device 4, provided along a direction in which the print sheet P moves. The printing device 2 forms an image on the print sheet P. The image formed on the print sheet P is inspected with the inspection device 3. Accordingly, the inspection object in the image inspection apparatus 1 according to the present embodiment is the print sheet P on which the image is formed.

The printing device 2 has plural storage parts 5 which hold plural types of print sheets P, the loop-shaped conveyance passage 6 which is connected to the storage parts 5, and which is capable of conveying the print sheet P twice in the same passage while turning over the print sheet by reversing the print sheet, the first conveyance unit 11 which is provided in a part of the conveyance passage 6, and which sucks and conveys the print sheet P, and the printing unit 7 which is provided above the first conveyance unit 11, and which discharges ink to form an image on the print sheet P conveyed with the first conveyance unit 11. The printing unit 7 has plural inkjet heads for different ink colors, and the printing unit 7 is capable of forming a color image on the both surfaces of the print sheet P.

The first conveyance unit 11 has the belt conveyer 8 in which a conveyance belt 14 is put around a downstream-side driving roller 9, an upstream-side driven roller 10, and two other small driven rollers 10a and 10b. The conveyance belt 14 has a large number of through holes. An unshown platen in which a large number of through holes are formed is in contact with the lower surface side of the conveyance belt 14 on the upper side of the first conveyance unit 11. Further, an unshown chamber is attached to the lower surface of the platen. The inside of the chamber is sucked with an unshown fan. In this manner, the first conveyance unit 11 is a suction-conveyance unit. When the fan is driven, the air is sucked from the position above the conveyance belt 14 through the through holes of the conveyance belt 14 and the platen into the chamber. The print sheet P is sucked to the upper surface side of the conveyance belt 14. When the conveyance belt 14 is driven, the print sheet P is conveyed at the first conveyance speed V1.

Note that the upstream side and the downstream side mean the upstream side and the downstream side of a conveyance direction in which the respective conveyance units 11 to 13 convey the print sheet P. Further, for the sake of convenience, the exposed surface of the print sheet P conveyed from the first conveyance unit 11 to the second conveyance unit 12 will be referred to as a front surface, and the opposite side, a rear surface.

The inspection device 3 has the second conveyance unit 12 and the first inspection unit 21. The second conveyance unit 12 is connected to the first conveyance unit 11 in the previous-stage printing device 2. The second conveyance unit 12 sucks and conveys the print sheet P with the front surface exposed to the upper side. The first inspection unit 21 is set so as to read an image in synchronization with the second conveyance speed V2 of the second conveyance unit 12. The configuration of the second conveyance unit 12 is approximately the same as the configuration of the first conveyance unit 11. The second conveyance unit 12 conveys the print sheet P at the second conveyance speed V2. The first inspection unit 21 is provided in a downward posture above the second conveyance unit 12 on the downstream side. The first inspection unit 21 inspects an image on the front surface of the print sheet P. The position in which the first inspection unit 21 is provided on the downstream side of the second conveyance unit 12 is a position downstream of an intermediate position between the first conveyance unit 11 and the second conveyance unit 12, indicated with a center line C in FIG. 1, by a length L1 which is equal to or longer than a half of the length of the print sheet P. In the image inspection apparatus 1, print sheets P in various sizes may be used. In such case, it is preferable to select a print sheet P having the maximum length in the conveyance direction, as a reference to set the above length L1, among the print sheets P which may be used.

When the length L1 is set as described above, when the front end of the print sheet P has reached the first inspection unit 21, the conveyance force of the first conveyance unit 11 acts only on the upstream-side part of the print sheet P having a length shorter than a half of the length of the print sheet P in the conveyance direction. On the other hand, the conveyance force of the second conveyance unit 12 acts on the downstream-side part of the print sheet P having a length equal to or longer than a half of the length of the print sheet P in the conveyance direction. That is, the timing of the start of inspection of the image on the print sheet P with the first inspection unit 21 is behind the change of the conveyance speed of the print sheet P to the second conveyance speed V2. The conveyance speed of the print sheet P during the inspection is constantly the second conveyance speed V2. Since the conveyance speed does not change, no disorder occurs in the image read with the first inspection unit 21.

The third conveyance unit 13 which sucks and conveys the print sheet P sent from the previous-stage second conveyance unit 12, with the rear surface exposed to the lower side, and a second inspection unit 22, provided in an upward posture below the third conveyance unit 13 on the downstream side, which inspects an image on the rear surface of the print sheet P, are provided on the downstream side of the second conveyance unit 12. The configuration of the third conveyance unit 13 is approximately the same as the configuration of the first conveyance unit 11 and the second conveyance unit 12; however, the posture of the third conveyance unit 13 is reversed upside down. Further, the second inspection unit 22 is set in a position away from an intermediate position between the second conveyance unit 12 and the third conveyance unit 13 by a length longer than the length L1, on the downstream side.

Note that pressing rollers 15 to press floating of the front end of the print sheet P are respectively provided above the driven roller 10 of the second conveyance unit 12 and below the driven roller 10 of the third conveyance unit 13. These pressing rollers 15 rotate in accordance with the conveyance belt 14.

The first inspection unit 21 and the second inspection unit 22 are CIS (Contact Image Sensor) having the same specification. The inspection part to read an image formed on the print sheet P for inspection is not limited to the CIS, but a sensor having other principle or structure may be used, or a camera may be used.

The post-processing device 4 performs various post-processing on the print sheet P, on which the image has been formed with the printing device 2 then the image has been inspected with the inspection device 3, and discharges the print sheet P. As contents of the post-processing, sorting work includes sorting and stacking, staple binding, lined paper insertion, paper folding in various forms, enclosure in envelopes, and the like. It is possible to provide the post-processing device 4 having necessary functions in accordance with purposes.

According to the image inspection apparatus 1, the first conveyance speed V1 of the first conveyance unit 11 in the printing device 2, the second conveyance speed V2 of the second conveyance unit 12 in the inspection device 3, and a third conveyance speed V3 of the third conveyance unit 13 in the inspection device 3 are controlled so as to be substantially the same. When the control is properly performed, the images on the print sheet P are inspected with the first inspection unit 21 and the second inspection unit 22 in the inspection device 3 without any problem.

Figure 9:
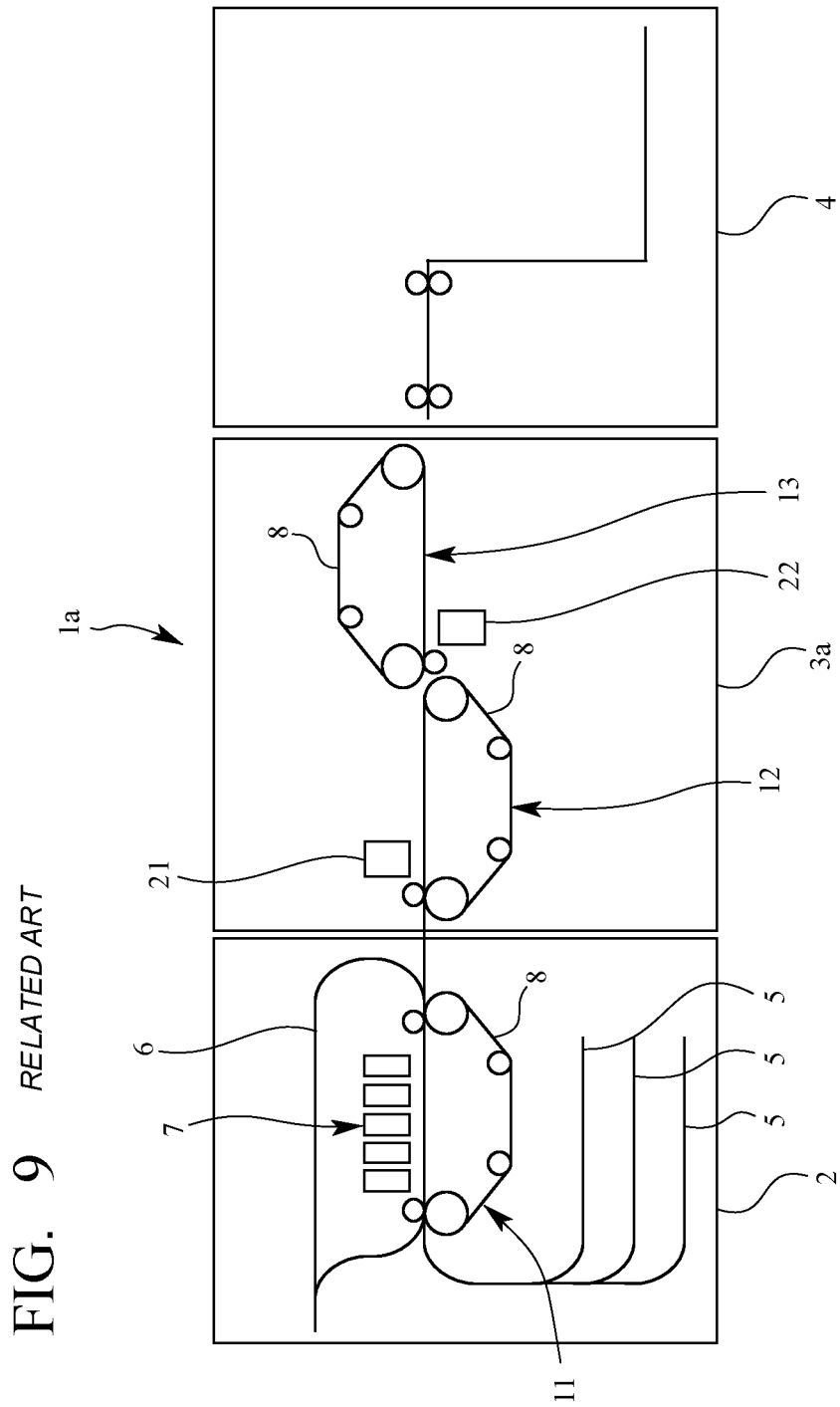
FIG. 9 is a schematic cross-sectional view showing the entire configuration of an image inspection apparatus proposed by the present inventors prior to the present invention.

As described in the paragraphs of "Technical Problem", in the image inspection apparatus 1a shown in FIG. 9, when the first conveyance speed V1 and the second conveyance speed V2 are not substantially the same, a problem occurs in reading of an image on the print sheet P. As described below in detail, in the image inspection apparatus 1 according to the present embodiment, this problem is solved by changing the above-described arrangement of the inspection units 21 and 22.

Figure 2A:
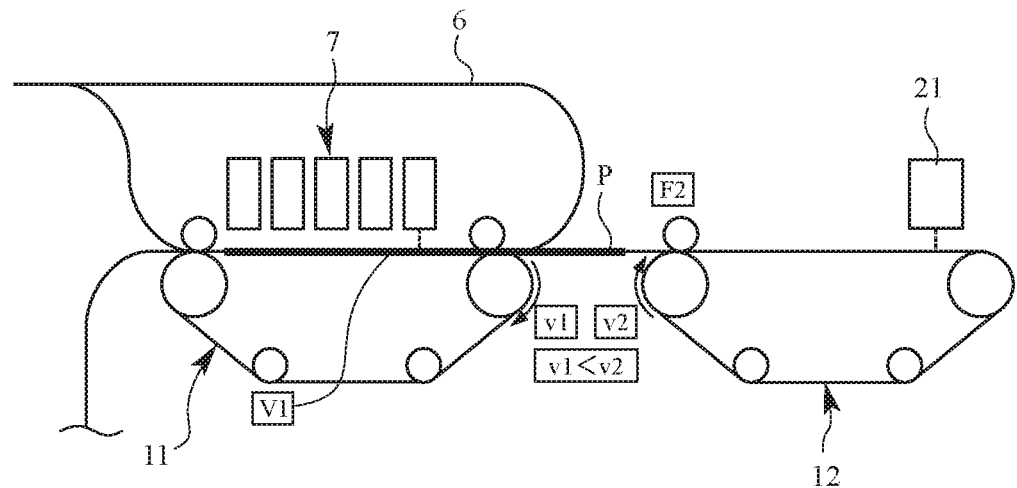
FIGS. 2A to 2C are schematic cross-sectional views continuously showing a process of inspection of an image on a print sheet in the image inspection apparatus according to the first embodiment when a second conveyance speed of an inspection device is higher than a first conveyance speed of a printing device.
Figure 2B:
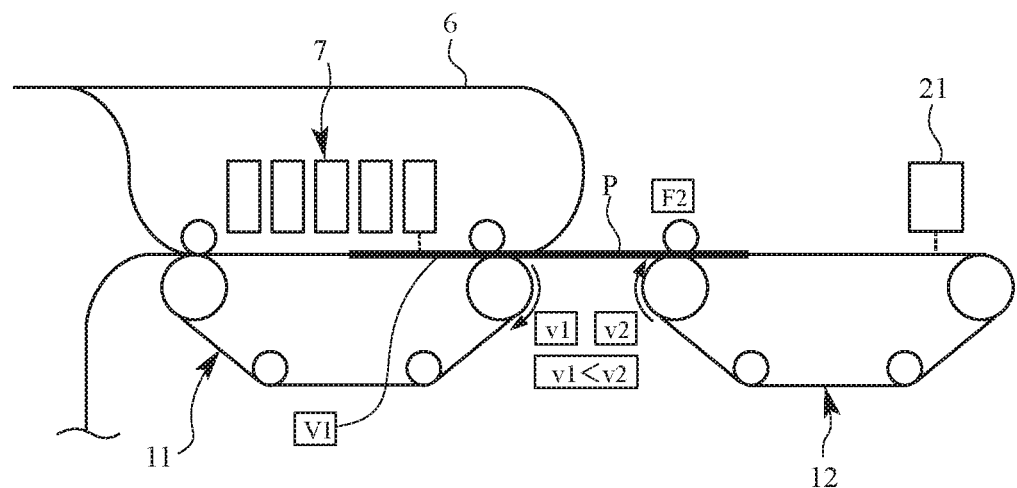
Figure 2C:
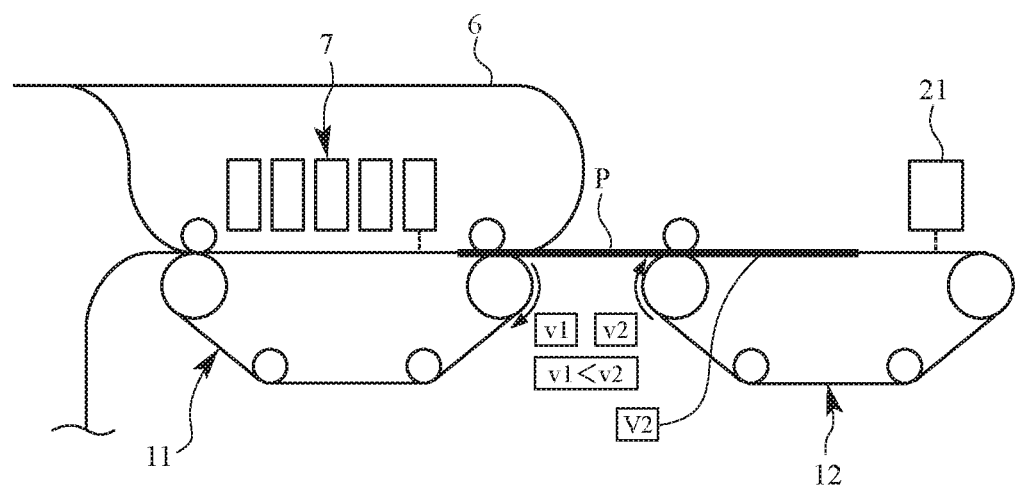

FIGS. 2A to 2C are schematic cross-sectional views continuously showing a process of inspection of an image on the print sheet P delivered from the first conveyance unit 11 to the second conveyance unit 12 with the first inspection unit 21 when the second conveyance speed V2 is higher than the first conveyance speed V1 (the conveyance speed on the downstream side is higher than the conveyance speed on the upstream side).

FIG. 2A shows a state of image formation with the printing unit 7 on the print sheet P being sucked and conveyed with the first conveyance unit 11. The front end of the print sheet P has not reached the second conveyance unit 12, and the print sheet P is conveyed at the first conveyance speed V1 (<second conveyance speed V2).

FIG. 2B shows a state of the image formation with the printing unit 7 at the rear end of the print sheet P being conveyed with the first conveyance unit 11 and the second conveyance unit 12. The front end of the print sheet P has already reached the second conveyance unit 12 and received the conveyance force of the second conveyance unit 12. Since the part sucked and conveyed with the first conveyance unit 11 is longer than the part sucked and conveyed with the second conveyance unit 12, the print sheet P is conveyed at the first conveyance speed V1(<second conveyance speed V2). The front end of the print sheet P has reached the second conveyance unit 12, but has not reached the first inspection unit 21 around the end of the second conveyance unit 12 on the downstream side. Accordingly, the inspection of the image on the print sheet P has not been started yet.

FIG. 2C shows a state of conveyance of the print sheet P with the first conveyance unit 11 and the second conveyance unit 12 after the completion of the image formation with the printing unit 7. In the print sheet P, the part sucked and conveyed with the second conveyance unit 12 is longer than the part sucked and conveyed with the first conveyance unit 11. Accordingly, the print sheet does not receive the influence of the first conveyance unit 11, and the print sheet is conveyed at the second conveyance speed V2(>first conveyance speed V1). That is, the conveyance speed of the print sheet P is higher than the state shown in FIG. 2B. However, the print sheet P has not reached the first inspection unit 21 yet, and the inspection of the image on the print sheet P has not been started yet. Thereafter, the print sheet P is inspected with the first inspection unit 21 while being conveyed at the second conveyance speed V2. During the inspection, the conveyance speed is constantly the second conveyance speed V2. No disorder occurs in the read image, and the inspection is appropriately performed.

Note that the front surface of the print sheet P is subjected to the inspection with the first inspection unit 21 then is passed through the second conveyance unit 12, and the rear surface of the print sheet P is subjected to the inspection with the second inspection unit 22 while being conveyed with the third conveyance unit 13. As described above, the second conveyance speed V2 and the third conveyance speed V3 are controlled so as to be substantially the same. Even when it is not configured to perform such control, the front end of the print sheet P reaches the second inspection unit 22 and inspection is started after the entrance of the part greater than the half of the print sheet P into the third conveyance unit 13 and the change of the print sheet conveyance speed to the third conveyance speed V3. Accordingly, during the inspection with the second inspection unit 22, the conveyance speed is constantly at the third conveyance speed V3. Regardless of whether or not the third conveyance speed V3 and the second conveyance speed V2 are the same, no disorder occurs in the image read with the second inspection unit 22. The inspection is appropriately performed on the image read with the second inspection unit 22.

Figure 3A:
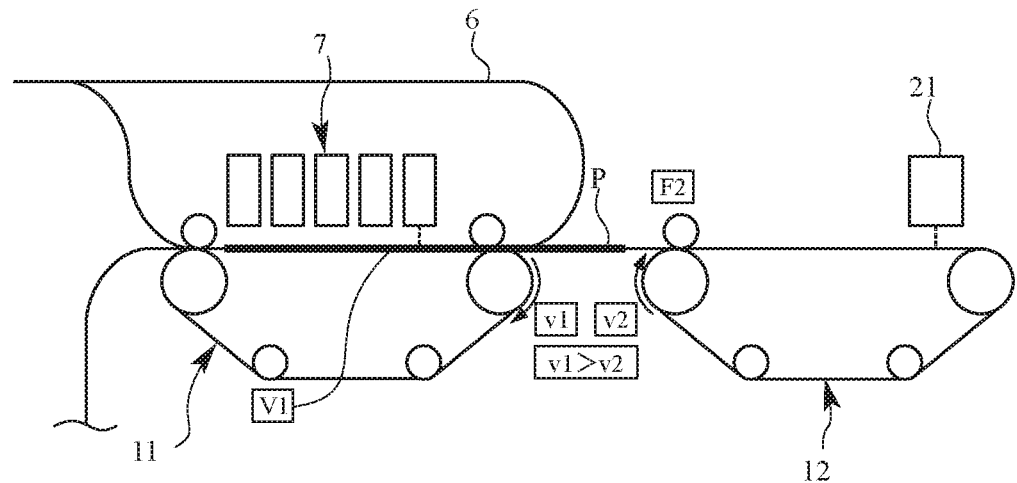
FIGS. 3A to 3C are schematic cross-sectional views continuously showing the process of inspection of the image on the print sheet in the image inspection apparatus according to the first embodiment when the first conveyance speed of the printing device is higher than the second conveyance speed of the inspection device.
Figure 3B:
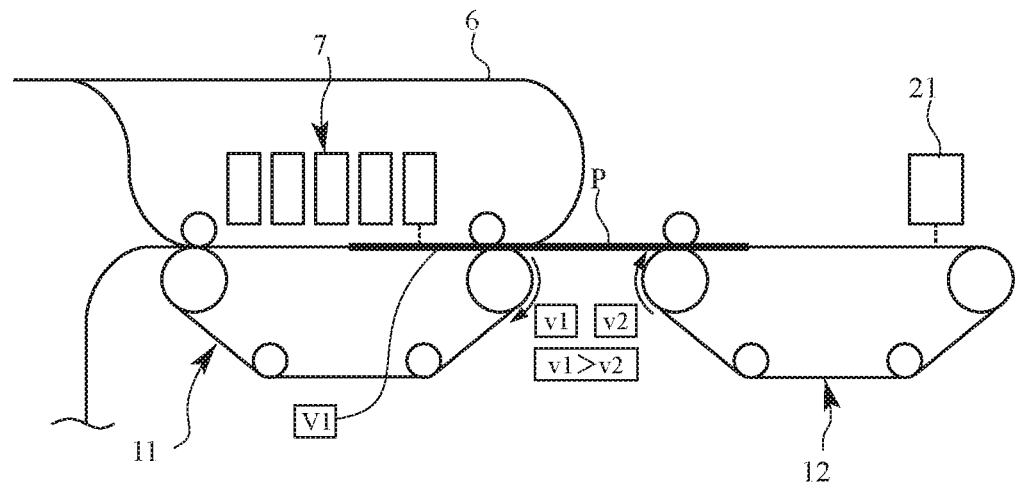
Figure 3C:
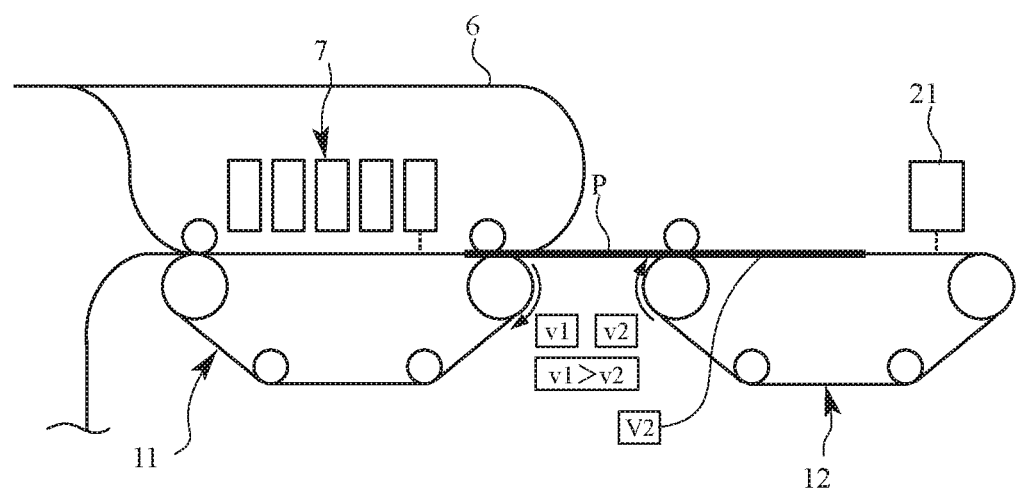

FIGS. 3A to 3C are schematic cross-sectional views continuously showing a process of inspection of an image on the print sheet P delivered from the first conveyance unit 11 to the second conveyance unit 12 with the first inspection unit 21, when the first conveyance speed V1 is higher than the second conveyance speed V2 (the conveyance speed on the upstream side is higher than the conveyance speed on the downstream side).

FIG. 3A shows a state of image formation with the printing unit 7 on the print sheet P being sucked and conveyed with the first conveyance unit 11. The front end of the print sheet P has not reached the second conveyance unit 12, and the print sheet P is conveyed at the first conveyance speed V1 (>second conveyance speed V2).

FIG. 3B shows a state of the image formation with the printing unit 7 at the rear end of the print sheet P being conveyed with the first conveyance unit 11 and the second conveyance unit 12. The front end of the print sheet P has already reached the second conveyance unit 12 and received the conveyance force of the second conveyance unit 12. Since the part sucked and conveyed with the first conveyance unit 11 is longer than the part sucked and conveyed with the second conveyance unit 12, the print sheet P is conveyed at the first conveyance speed V1(>second conveyance speed V2). The front end of the print sheet P has reached the second conveyance unit 12, but has not reached the first inspection unit 21 around the end of the second conveyance unit 12 on the downstream side. Accordingly, the inspection of the image on the print sheet P has not been started yet.

FIG. 3C shows a state of conveyance of the print sheet P with the first conveyance unit 11 and the second conveyance unit 12 after the completion of the image formation with the printing unit 7. In the print sheet P, the part suck-conveyed with the second conveyance unit 12 is longer than the part sucked and conveyed with the first conveyance unit 11. Accordingly, the print sheet does not receive the influence of the first conveyance unit 11, and the print sheet is conveyed at the second conveyance speed V2(<first conveyance speed V1). That is, the conveyance speed of the print sheet P is lower than the state shown in FIG. 3B. However, the print sheet P has not reached the first inspection unit 21 yet, and the inspection of the image on the print sheet P has not been started yet. Thereafter, the print sheet P is inspected with the first inspection unit 21 while being conveyed at the second conveyance speed V2. During the inspection, the conveyance speed is constantly the second conveyance speed V2. No disorder occurs in the read image, and the inspection is appropriately performed.

Note that the front surface of the print sheet P is subjected to the inspection with the first inspection unit 21 then is passed through the second conveyance unit 12, and the rear surface of the print sheet P is subjected to the inspection with the second inspection unit 22 while being conveyed with the third conveyance unit 13. As in the case of the inspection process described with reference to FIGS. 2A to 2C, regardless of whether or not the third conveyance speed V3 of the third conveyance unit 13 and the second conveyance speed V2 of the second conveyance unit 12 are the same, no disorder occurs in the image read with the second inspection unit 22. The inspection is appropriately performed.

A second embodiment of the present invention will be described with reference to FIG. 4.

Figure 4:
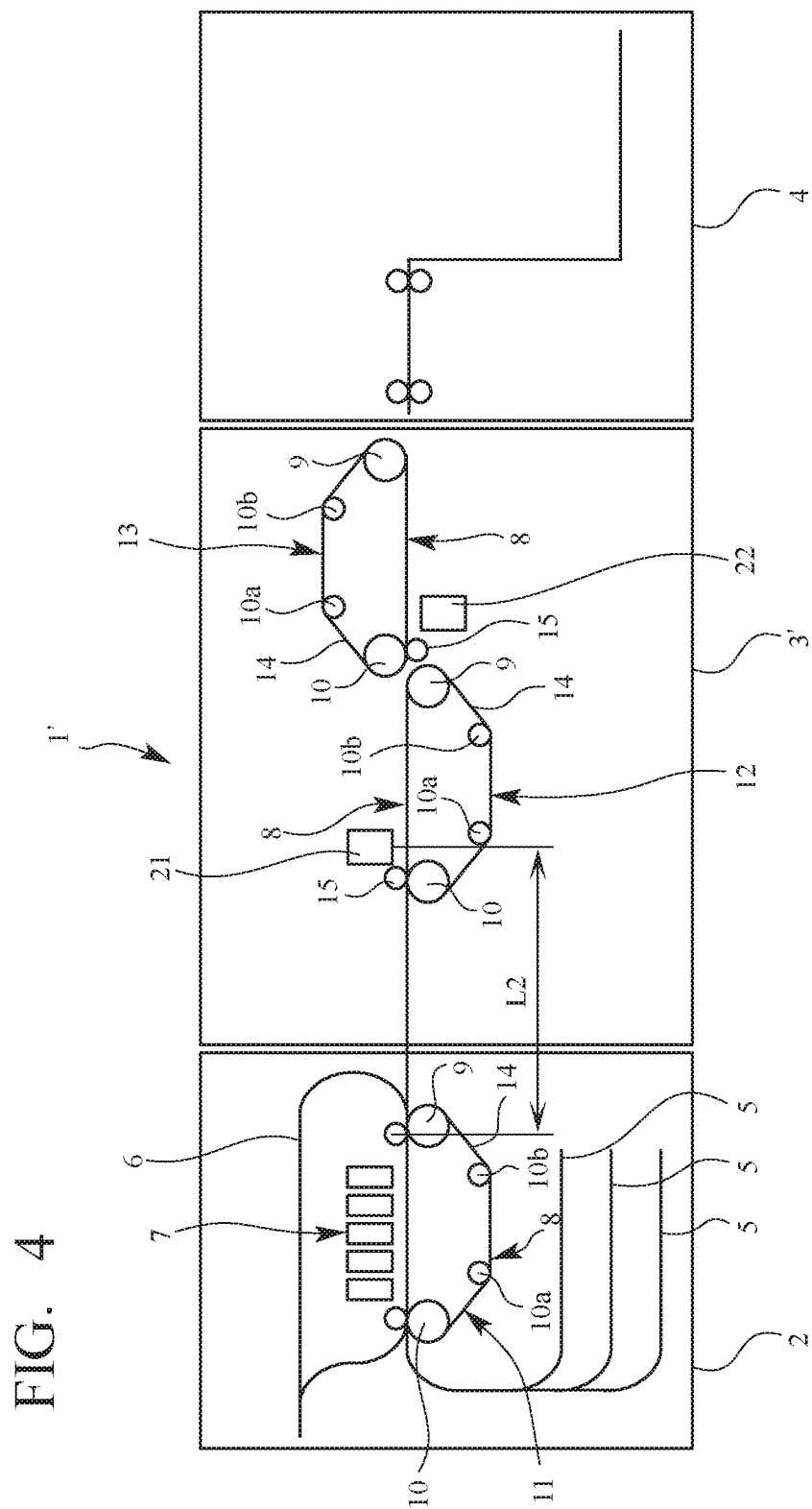
FIG. 4 is a schematic cross-sectional view showing the entire configuration of the image inspection apparatus according to a second embodiment.

FIG. 4 shows an image inspection apparatus 1' according to the second embodiment. The basic configuration of the image inspection apparatus 1' according to the second embodiment is the same as the configuration of the image inspection apparatus 1 according to the first embodiment. In FIG. 4, the constituent elements corresponding to the constituent elements of the first embodiment have the same as reference numerals the reference numerals in FIG. 1, and the description of the first embodiment will be referred to. As described below, the second embodiment differs from the first embodiment only in the arrangement of the first inspection unit 21 and the second inspection unit 22.

As shown in FIG. 4, the first inspection unit 21 in the image inspection apparatus 1' according to the second embodiment is provided in a downward posture above the second conveyance unit 12 on the upstream side. An interval L2 between the first inspection unit 21 and the downstream-side end of the first conveyance unit 11 on the upstream side is longer than the length of the print sheet. Note that the downstream-side end of the first conveyance unit 11 is not the right end of the driving roller 9 which is the end as a shape and on which the conveyance belt 14 is put, but means the rightmost position in the first conveyance unit 11 to apply the conveyance force to the print sheet P. In the present embodiment, considering that the maximum available print-sheet size in the image inspection apparatus 1' is A3, and the vertical length of the A3-sized print sheet is 420 mm, it is set such that L2=420 mm holds. With this configuration, the length of an inspection device 3' according to the second embodiment in the conveyance direction is longer than the length of the inspection device 3 in the conveyance direction in the first embodiment.

As shown in FIG. 4, the second inspection unit 22 of the image inspection apparatus 1' according to the second embodiment is provided in an upward posture below the third conveyance unit 13 on the upstream side. As in the case of the first embodiment, the second conveyance unit 12 and the third conveyance unit 13 are arrayed without gaps.

In the image inspection apparatus 1' according to the second embodiment, even when an A3-sized sheet is conveyed in portrait as the print sheet P, when the front end of the print sheet P reaches the first inspection unit 21, the rear end of the print sheet P is already away from the first conveyance unit 11. The print sheet P receives only the conveyance force of the second conveyance unit 12. That is, the timing of the start of inspection of the image on the print sheet P with the first inspection unit 21 is behind the change of the conveyance speed of the print sheet P to the second conveyance speed V2. The conveyance speed of the print sheet P during the inspection is constantly the second conveyance speed V2. Since the conveyance speed does not change, no disorder occurs in the image read with the first inspection unit 21. As long as the length of the print sheet P in the conveyance direction is shorter than the length of the A3-sized sheet in the conveyance direction, the same advantage is obtained.

Note that in the image inspection apparatus 1' according to the second embodiment, by setting the interval between the downstream-side end of the second conveyance unit 12 and the second inspection unit 22 to 420 mm as in the case of the above interval L2, the length of the inspection device 3' in the conveyance direction is longer than the length of the inspection device 3' in the conveyance direction shown in FIG. 4. However, in the case where the A3-sized sheet is conveyed in portrait as the print sheet P, even when the conveyance speed V2 of the second conveyance unit 12 and the conveyance speed V3 of the third conveyance unit 13 are not substantially the same, the inspection with the second inspection unit 22 is started after the change of the conveyance speed of the print sheet P to the constant conveyance speed V3. Accordingly, no problem occurs in the inspection with the second inspection unit 22.

In the above-described first and second embodiments, the suction-conveyance unit using a suction fan as the conveyance unit is shown. Further, a suction unit using the principle of electrostatic adsorption may be used, i.e., a suction unit having any suction principle and structure may be used. Further, the occurrence of malfunction in the image inspection on the downstream side due to the difference between the upstream-side conveyance speed and the downstream-side conveyance speed is not limited to the suction type conveyance units but the malfunction also occurs in roller-conveyance type conveyance units. The example of this case will be described next as a third embodiment.

The third embodiment of the present invention will be described with reference to FIG. 5.

Figure 5:
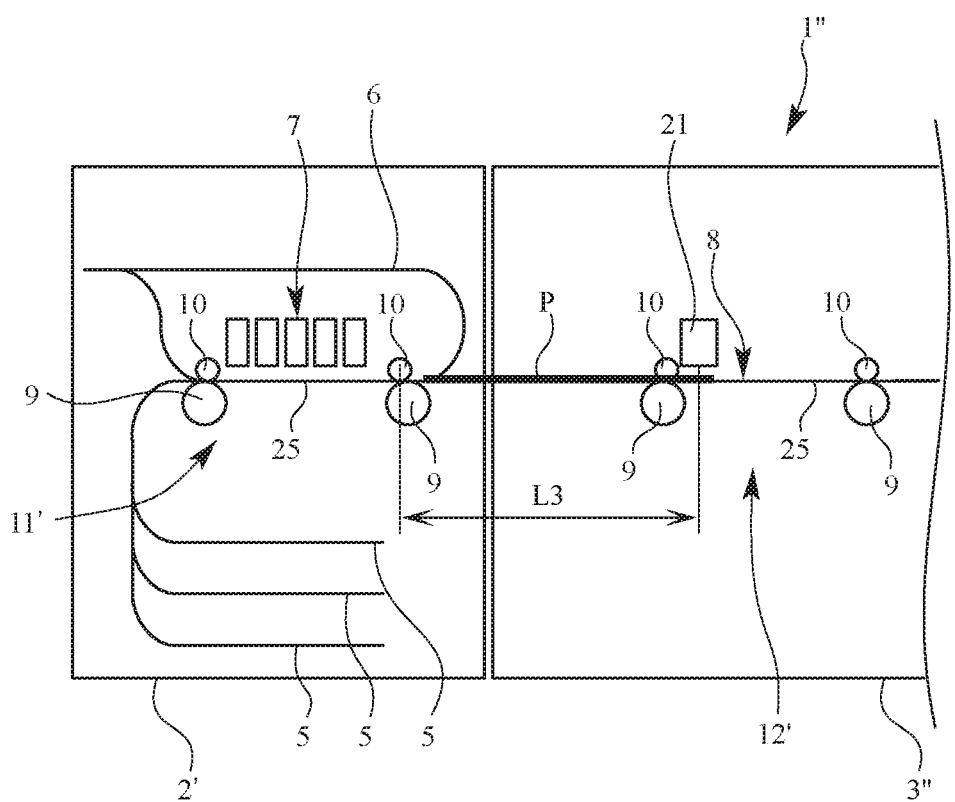
FIG. 5 is a schematic cross-sectional view showing a part of the entire configuration of the image inspection apparatus according to a third embodiment.

FIG. 5 shows an image inspection apparatus 1'' according to the third embodiment. Among the constituent elements of the image inspection apparatus 1'' according to the third embodiment, the constituent elements corresponding to the constituent elements of the first embodiment have the same as reference numerals the reference numerals in FIG. 1, and the description of the first embodiment will be referred to. As described below, the third embodiment differs from the first embodiment in the use of a roller-type conveyance unit and in the arrangement of the first inspection unit 21.

As shown in FIG. 5, a first conveyance unit 11' of a printing device 2' and a second conveyance unit 12' of an inspection device 3'' are roller conveyance units. The first conveyance unit 11' and the second conveyance unit 12' respectively have two pairs of driving roller 9 and driven roller 10 to convey the print sheet by holding the print sheet P and applying the holding force to the print sheet P. Further, in FIG. 5, reference numeral 25 denotes a conveyance passage for the print sheet P set from the first conveyance unit 11' through the second conveyance unit 12' to the downstream side.

As show in FIG. 5, the arrangement of the first inspection unit 21 in the third embodiment differs from the first and second embodiments. In the present embodiment, the first conveyance speed V1 of the upstream-side first conveyance unit 11' and the second conveyance speed V2 of the down-stream-side second conveyance unit 12' are controlled so as to be the same. However, the conveyance speeds V1 and V2 may not be substantially the same due to tolerance among the constituent parts. In such case, in a state where the print sheet P is conveyed while being held with only the upstream-side first conveyance unit 11', the conveyance speed of the print sheet P is V1. In a state where the print sheet P is conveyed while being simultaneously held with the upstream-side first conveyance unit 11' and the down-stream-side second conveyance unit 12', the conveyance speed of the print sheet P is not constant. Further, in a state where the print sheet is conveyed while being held with only the downstream-side conveyance unit, the conveyance speed of the print sheet P is V2.

Accordingly, in the present embodiment, the first inspection unit 21 is provided on the downstream side from the position of the front end of the print sheet P when the conveyance speed has become the second conveyance speed V2 by application of the holding force only from the second conveyance unit 12' to the print sheet P. That is, as shown in FIG. 5, assuming that a distance from a nip point between the driving roller 9 and the driven roller 10 on the downmost stream side at which the first conveyance unit 11' applies the holding force to the print sheet P to the inspection position of the first inspection unit 21 is L3, the distance L3 may have any value as long as the length is equal to or longer than a length obtained by subtracting the length of a margin from the front end of the print sheet P to an image reading start position from the length of the print sheet P in the conveyance direction. When the first inspection unit 21 is provided in this manner, as shown in FIG. 5, immediately after the passage of the rear end of the conveyed print sheet P through the first conveyance unit 11' and the change of the conveyance speed to the constant second conveyance speed V2, the front end of the print sheet P passes through the inspection position of the first inspection unit 21 and the inspection is started from the image closest to the front end.

As described above, the conveyance unit in the present invention is not limited to the suction type conveyance unit as in the first and second embodiments. However, when the roller conveyance unit as in the case of the third embodiment is used, there is a possibility that the print sheet flaps in a direction vertical to the drawing during the conveyance. Accordingly, as an inspection unit, it is preferable to use another image inspection device with a shallow focal depth rather than the CIS with a deep focal depth.

A fourth embodiment of the present invention will be described with reference to FIG. 6 and FIG. 7.

Figure 6:
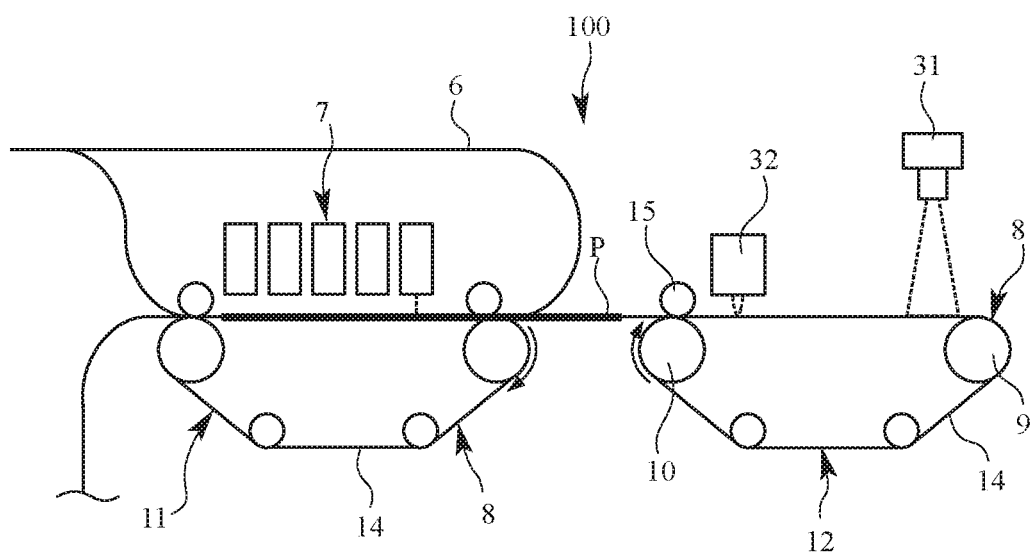
FIG. 6 is a schematic cross-sectional view showing the entire configuration of the image inspection apparatus according to a fourth embodiment.

FIG. 6 shows an image inspection apparatus 100 according to the fourth embodiment. In the configuration of the image inspection apparatus 100 according to the fourth embodiment, the constituent elements corresponding to the constituent elements of the first embodiment have the same as reference numerals the reference numerals in FIG. 1, and the description of the first embodiment will be referred to. As described below, the fourth embodiment differs from the first embodiment in that the first inspection unit provided in a downward posture above the second conveyance unit 12 includes a camera 31 as the first inspection part and a CIS 32 as the second inspection part.

Note that FIG. 6 lacks a constituent element corresponding to the third conveyance unit 13. However, when only the front surface of the print sheet P is to be inspected, such constituent element is not required. It may be configured such that the constituent element corresponding to the third conveyance unit 13 is provided for inspection of the rear surface of the print sheet P. In this case, a camera and a CIS may be provided as in the case of the second conveyance unit 12, as the second inspection unit 22 provided in an upward posture below the third conveyance unit 13, as needed.

The camera 31 has a deep focal depth in comparison with the CIS 32 as the second inspection part, and has a comparatively large allowable error of the installation location. As an example of numerical value, assuming that the installation location is 120 mm from an image sensing object, the allowable error is about ±2 to 3 mm. Further, the reading accuracy is relatively high in comparison with the CIS 32 as the second inspection part. As an example of numerical value, the reading accuracy is about 300 dpi. As the camera 31 has this high reading accuracy, the camera 31 is used for image sensing an image especially requiring high-accuracy reading, among the images formed on the print sheet P as the inspection object.

Figure 7:
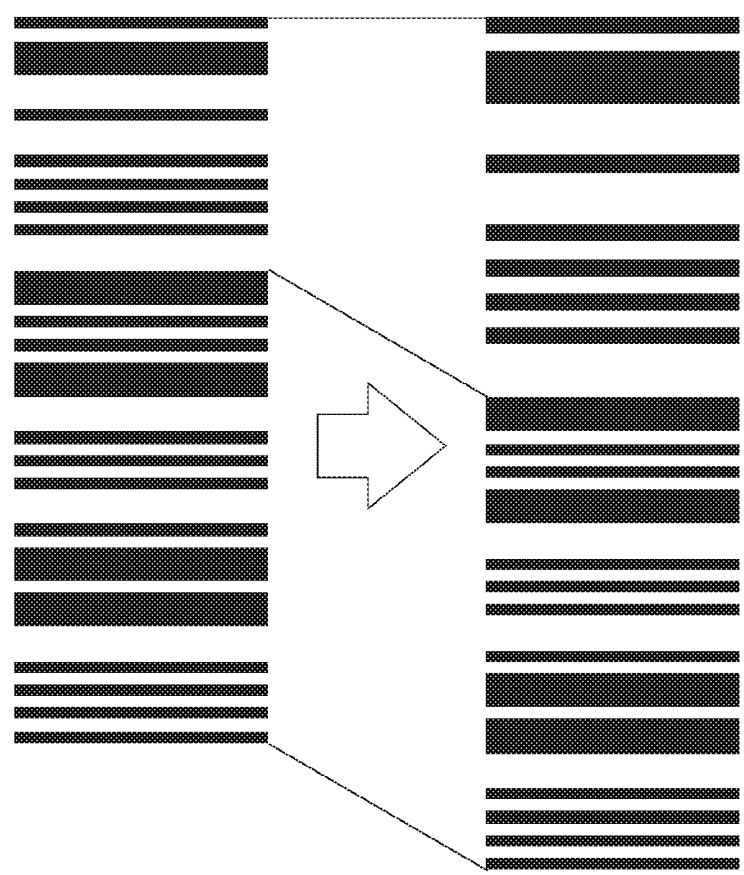
FIG. 7 shows a bar code as an object of image sensing with a camera in the image inspection apparatus according to the fourth embodiment.

FIG. 7 shows a bar code as an example of the image subjected to image sensing with the camera 31. The bar code is configured with a combination of a narrow bar NB, a wide bar WB, narrow space NS, and wide space WS. The ratio of the width of the narrow bar NB to the width of the wide bar WB, and the ratio of the width of the narrow space NS to the width of the wide space WS, regarding a bar-code reading direction (vertical direction, i.e., a direction orthogonal to the bar in FIG. 7) are set to predetermined values, e.g., about 1:2 to 1:3. The left part of FIG. 7 shows an image of the bar code read with the camera 31 when the print sheet is conveyed at the conveyance speed V1, and the right part of FIG. 7 shows an image of the same bar code read with the camera 31 when the print sheet is conveyed at the conveyance speed V2 higher than the conveyance speed V1. That is, in comparison with the image read when the print sheet is conveyed at the conveyance speed V1, the image read when the print sheet is conveyed at the conveyance speed V2 higher than the conveyance speed V1 is extended in the reading direction. Accordingly, when the conveyance speed of the print sheet changes in the middle of reading of the bar code, since the above-described ratio of the read image of the bar code changes in the image, it is impossible to perform reading. Note that the degree of deviation from the specified value of the ratio of the width of the narrow bar NB to the width of the wide bar WB, defined in the bar code, at which reading is impossible, is determined based on the performance of the reading device (camera).

Accordingly, as in the case of the first inspection unit 21 in the first embodiment, the camera 31 is provided in a position to start image inspection when the conveyance speed of the print sheet P has changed to the second conveyance speed V2. That is, the camera 31 is located in a position downstream of the intermediate position between the first conveyance unit 11 and the second conveyance unit 12 by a length equal to or longer than a half of the length of the print sheet P (L1 in FIG. 1 in the first embodiment). In the present embodiment, the position is in the vicinity of the driving roller 9 of the second conveyance unit 12.

The CIS 32 has a shallow focal depth in comparison with the camera 31 as the first inspection part, and has a comparatively small allowable error of the installation location. As an example of numerical value, assuming that the installation location is 12 mm from an image sensing object, the allowable error is about ±0.2 mm. Further, the reading accuracy is relatively low in comparison with the camera 31 as the first inspection part. As an example of numerical value, the reading accuracy is about 200 dpi. As the CIS 32 has low reading accuracy, the CIS 32 is used for image sensing other image than the image especially requiring high-accuracy reading, among the images formed on the print sheet P as the inspection object. For example, the CIS 32 is used for inspection of the entire image printed on the print sheet P based on bitmap data. The necessity of use of the camera 31 for this image reading is low, and the CIS 32 is sufficiently available in the point of reading accuracy. Further, even when the conveyance speed of the print sheet P changes upon reading with the CIS 32, the influence on the reading is small. Accordingly, regarding the installation location of the CIS 32, the necessity to satisfy the conditions as in the case of the camera 31 is low. That is, the CIS 32 may be provided in the vicinity of the pressing roller 15 on the upstream side from the camera 31 in the second conveyance unit 12.

In the image inspection apparatus 100 according to the fourth embodiment, the object of reading with the camera 31 is a bar code which requires high accuracy reading. The reading accuracy of the camera 31 has a resolution necessary for bar code reading. Further, the timing of the start of the inspection of the image on the print sheet P with the camera 31 is behind the change of the conveyance speed of the print sheet P to the second conveyance speed. Accordingly, even when the first conveyance speed and the second conveyance speed are not substantially the same, the conveyance speed of the print sheet P during the inspection of the print sheet P with the camera 31 is constantly the second conveyance speed, and the conveyance speed does not change. No disorder occurs in the image read with the camera 31, and no problem occurs in the reading. On the other hand, the object of reading with the CIS 32 with relatively low reading accuracy is an image which does not require high accuracy reading. Even when the conveyance speed of the print sheet P changes in the middle of conveyance of the print sheet P, no substantial problem occurs in the reading with the CIS 32. Note that a bar-code reader to perform optical reading by using laser or the like may be used in place of the camera 31.

A fifth embodiment of the present invention will be described with reference to FIG. 8.

Figure 8:
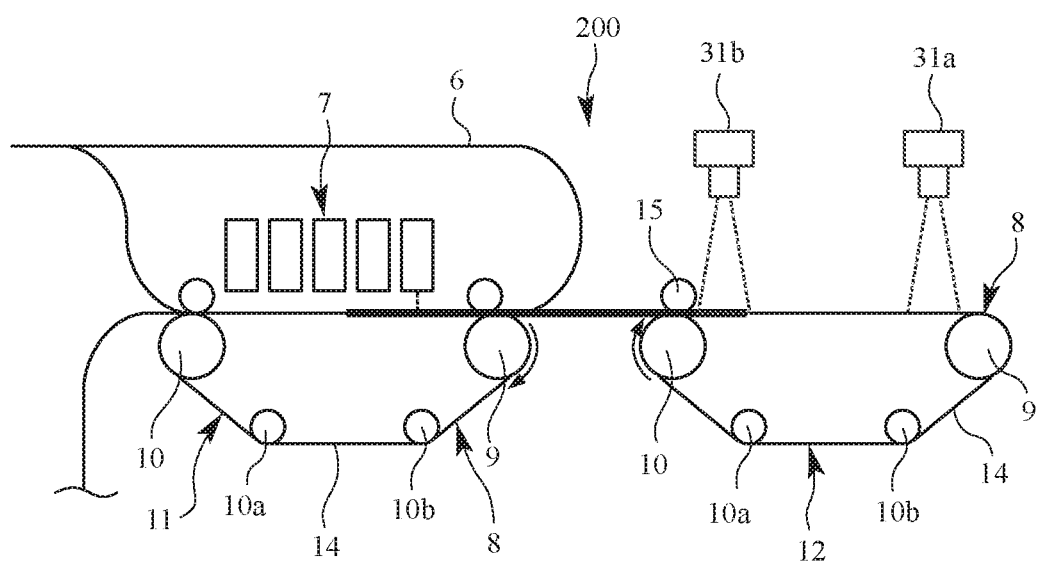
FIG. 8 is a schematic cross-sectional view showing the entire configuration of the image inspection apparatus according to a fifth embodiment.

FIG. 8 shows an image inspection apparatus 200 according to the fifth embodiment. Among the constituent elements of the image inspection apparatus 200 according to the fifth embodiment, the constituent elements corresponding to the constituent elements of the first embodiment have the same as reference numerals the reference numerals in FIG. 1, and the description of the first embodiment will be referred to. As described below, the fifth embodiment differs from the first embodiment in that the first inspection unit provided in a downward posture above the second conveyance unit 12 includes two cameras, i.e., a camera 31a and a camera 31b, as the first inspection part.

Note that FIG. 8 lacks a constituent element corresponding to the third conveyance unit 13 in the first embodiment. However, when only the front surface of the print sheet P is to be inspected, such constituent element is not required. It may be configured such that in FIG. 8, the constituent element corresponding to the third conveyance unit 13 of the first embodiment is provided for inspection of the rear surface of the print sheet P. In this case, as the second inspection unit 22 provided in an upward posture below the third conveyance unit 13, two cameras may be provided as in the case of the second conveyance unit 12, as needed.

The camera 31a and the camera 31b are the same as the camera 31 according to the fourth embodiment. The camera 31a and the camera 31b are high reading-accuracy inspection units respectively having a deep focal depth and a comparatively large allowable error of the installation position in comparison with the CIS.

One of the cameras, the camera 31a is used for image sensing of an image which requires especially high accuracy reading among images formed on the print sheet P as the inspection object. More particularly, the camera 31a reads a bar code as described in the fourth embodiment. As in the case of the camera 31 according to the fourth embodiment, the camera 31a is provided in a position to start image inspection when the conveyance speed of the print sheet P has changed to the second conveyance speed V2. That is, the camera 31a is located in a position downstream of the intermediate position between the first conveyance unit 11 and the second conveyance unit 12 by a length equal to or longer than a half of the length of the print sheet P (L1 in FIG. 1 in the first embodiment). In the present embodiment, the position is in the vicinity of the driving roller 9 of the second conveyance unit 12.

Further, the other one of the cameras, the camera 31b, is used for image sensing other image than the image especially requiring high-accuracy reading, among the images formed on the print sheet P as the inspection object. For example, the camera 31b is used for reading a page number (numeral) of the print sheet, other characters, and the like. In a case where characters are read with the camera, even when the conveyance speed of the print sheet changes, the influence on the reading is small in comparison with the case of bar code. Accordingly, regarding the installation location of the camera 31b, the necessity to satisfy the conditions as in the case of the camera 31 is low. That is, the camera 31b may be provided in the vicinity of the pressing roller 15 on the upstream side from the camera 31a in the second conveyance unit 12.

In the image inspection apparatus 200 according to the fifth embodiment, the object of reading with the camera 31*a* is a bar code which requires high accuracy reading. The reading accuracy of the camera 31*a* has a resolution necessary for bar code reading. Further, the timing of the start of the inspection of the image on the print sheet P with the camera 31*a* is behind the change of the conveyance speed of the print sheet P to the second conveyance speed. Accordingly, even when the first conveyance speed and the second conveyance speed are not substantially the same, the conveyance speed of the print sheet P during the inspection of the print sheet P with the camera 31*a* is constantly the second conveyance speed, and the conveyance speed does not change. Accordingly, no disorder occurs in the image read with the camera 31, and no problem occurs in the reading. On the other hand, the object of reading with the camera 31*b* with relatively low reading accuracy is an image which does not require high accuracy reading. Even when the conveyance speed of the print sheet P changes in the middle of conveyance of the print sheet P, no substantial problem occurs in the reading with the camera 31*b*. Note that a bar-code reader to perform optical reading by using laser or the like may be used in place of the camera 31*a*.

<Configuration and Advantages of Image Inspection Apparatus 1 According to Respective Aspects in Embodiments>

The characteristic feature of the image inspection apparatus 1, 1' or 1" according to a first aspect is that, the image inspection apparatus 1, 1' or 1" has: the downstream-side second conveyance unit 12 to convey the sheet-type inspection object P, conveyed at the first conveyance speed V1 with the upstream-side first conveyance unit 11, at the second conveyance speed V2; and the inspection unit 21 to inspect an image formed on the inspection object P conveyed with the second conveyance unit 12. The inspection unit 21 is provided in the position to start image inspection when the conveyance speed of the inspection object P has changed to the second conveyance speed V2.

In the image inspection apparatus 1, 1' or 1" according to the first aspect, it is possible to perform inspection on the image on the inspection object P with the inspection unit 21 while conveying the inspection object P with the upstream-side first conveyance unit 11 and the downstream-side second conveyance unit 12. At this time, even when the first conveyance speed V1 and the second conveyance speed V2 are not substantially the same, the timing of the start of the inspection of the image on the inspection object P with the inspection unit 21 is behind the change of the conveyance speed of the inspection object P to the second conveyance speed V2. Accordingly, the conveyance speed of the inspection object P during the inspection is constantly the second conveyance speed V2, and the conveyance speed does not change. No disorder occurs in the image read with the inspection unit 21.

The characteristic feature of the image inspection apparatus 1, 1' or 1" according to the second aspect is that, in the image inspection apparatus 1, 1', or 1 according to the first aspect, the inspection unit 21 is provided on the downstream side of the position of the front end of the inspection object P when the holding force to determine the conveyance speed of the inspection object P is applied with the second conveyance unit 12 or 12'.

In the image inspection apparatus 1, 1', or 1" according to the second aspect, it is possible to perform inspection on the image on the inspection object P with the inspection unit 21 while holding and conveying the inspection object P with the upstream-side first conveyance unit 11 and the downstream-side second conveyance unit 12. Note that the inspection unit 21 is provided on the downstream side from the position of the front end of the inspection object P when the holding force of the conveyance unit to determine the conveyance speed of the inspection object P is applied with the second conveyance unit 12 or 12'. Accordingly, even when the first conveyance speed V1 and the second conveyance speed V2 are not substantially the same, the timing of the start of the inspection of the image on the inspection object P with the inspection unit 21 is behind the change of the conveyance speed of the inspection object P to the second conveyance speed V2 by the operation of the holding force of the second conveyance unit 12, 12'. Accordingly, the conveyance speed of the inspection object P during the inspection is constantly the second conveyance speed V2, and the conveyance speed does not change. No disorder occurs in the image read with the inspection unit 21.

The characteristic feature of the image inspection apparatus 1 or 1' according to a third aspect is that, in the image inspection apparatus 1 or 1' according to the second aspect, the first conveyance unit 11 and the second conveyance unit 12 are suction conveyance units to suck and convey the inspection object P, and that the inspection unit 21 is provided in the position downstream of the intermediate position between the first conveyance unit 11 and the second conveyance unit 12 by the length equal to or longer than a half of the length of the inspection object P.

In the image inspection apparatus 1 or 1' according to the third aspect, the inspection unit 21 is provided in the position downstream of the intermediate position between the first conveyance unit 11 and the second conveyance unit 12 by the length equal to or longer than a half of the length of the inspection object P. Accordingly, when the front end of the inspection object P has reached the inspection unit 21, the conveyance force by the suction force of the first conveyance unit 11 acts only on the upstream-side part of the inspection object P having the length shorter than a half of the length of the inspection object P in the conveyance direction. On the other hand, the conveyance force by the suction force of the second conveyance unit 12 acts on the downstream-side part of the inspection object P having the length longer than a half of the length of the inspection object P in the conveyance direction. That is, the timing of the start of inspection of the image on the inspection object P with the inspection unit 21 is behind the change of the suction force of the second conveyance unit 12 applied to the inspection object P to be larger than the suction force of the first conveyance unit 11 applied to the inspection object P and the change of the conveyance speed of the inspection object P to the second conveyance speed V2. Accordingly, the conveyance speed of the inspection object P during the inspection is constantly the second conveyance speed V2. Since the conveyance speed does not change, no disorder occurs in the image read with the inspection unit 21.

The characteristic feature of the image inspection apparatus 1 or 1' according to a fourth aspect is that, in the image inspection apparatus 1 or 1' according to the first aspect, the interval between the downstream-side end of the first conveyance unit 11 and the inspection unit 21 is longer than the length of the inspection object P.

In the image inspection apparatus 1 or 1' according to the fourth aspect, since the interval between the downstream-side end of the first conveyance unit 11 and the inspection unit 21 is longer than the length of the inspection object P, when the front end of the inspection object P has reached the first inspection unit 21, the rear end of the inspection object P is already away from the first conveyance unit 11. The inspection object P has received only the conveyance force of the second conveyance unit 12. That is, the timing of the start of inspection of the image on the inspection object P with the inspection unit 21 is behind the change of the conveyance speed of the inspection object P to the second conveyance speed V2. Accordingly, the conveyance speed of the inspection object P during the inspection is constantly the second conveyance speed V2. Since the conveyance speed does not change, no disorder occurs in the image read with the inspection unit 21.

The characteristic feature of the image inspection apparatus 100 according to a fifth aspect is that, in the image inspection apparatus according to the first aspect, the inspection unit includes the first inspection part 31 having relatively high reading accuracy and the second inspection part 32 having relatively low reading accuracy, and that the first inspection part 31 is provided in the position to start inspection of the image when the conveyance speed of the inspection object P has changed to the second conveyance speed V2.

In the image inspection apparatus 100 according to the fifth aspect, the reading accuracy of the first inspection part 31 is high in comparison with the second inspection part 32. Further, since the timing of the start of the inspection of the image on the inspection object P with the first inspection part 31 is behind the change of the conveyance speed of the inspection object P to the second conveyance speed V2, even when the first conveyance speed V1 and the second conveyance speed V2 are not substantially the same, the conveyance speed of the inspection object P during the inspection of the inspection object P with the first inspection part 31 is constantly the second conveyance speed V2, and the conveyance speed does not change. Accordingly, no disorder occurs in the image read with the first inspection part 31, and no problem occurs in the reading. On the other hand, when the object of reading with the second inspection part 32 with relatively low reading accuracy is an image which does not require high accuracy reading, even when the conveyance speed of the inspection object P changes in the middle of conveyance of the inspection object P, no substantial problem occurs in the reading with the second inspection part 32.

The characteristic feature of the image inspection apparatus 200 according to a sixth aspect is that, in the image inspection apparatus according to the first aspect, the inspection unit includes the at least two first inspection parts 31a and 31b having relatively high reading accuracy, and that, of the at least two first inspection parts 31a and 31b, the first inspection part 31a to read an image which requires high-accuracy reading is provided in the position to start inspection of the image when the conveyance speed of the inspection object P has changed to the second conveyance speed V2.

The first inspection part of the present invention includes the two first inspection parts 31a and 31b in the above-described embodiments; however, the first inspection part may include three inspection parts or more. Of the three inspection parts or more, the one first inspection part or more to read an image which requires high-accuracy reading is provided in the position to start inspection of the image when the conveyance speed of the inspection object P has changed to the second conveyance speed V2.

In the image inspection apparatus 200 according to the sixth aspect, the reading accuracy of the first inspection part 31a is relatively high. Further, since the timing of the start of the inspection of the image on the inspection object P with the first inspection part 31a is behind the change of the conveyance speed of the inspection object P to the second conveyance speed V2, even when the first conveyance speed V1 and the second conveyance speed V2 are not substantially the same, the conveyance speed of the inspection object P during the inspection of the inspection object P with the first inspection part 31a is constantly the second conveyance speed V2, and the conveyance speed does not change. Accordingly, no disorder occurs in the image read with the first inspection part 31a, and no problem occurs in the reading. On the other hand, when the object of reading with the first inspection part 31b is an image which does not require high accuracy reading, even when the conveyance speed of the inspection object P changes in the middle of conveyance of the inspection object P, no substantial problem occurs in the reading with the first inspection part 31b.

DESCRIPTION OF REFERENCE SIGNS 1, 1', 1": image inspection apparatus
2, 2": printing device
3, 3', 3": inspection device as main part of image inspection function of image inspection apparatus
4: post-processing device
8: belt conveyer
11, 11': first conveyance unit
12, 12': second conveyance unit
13: third conveyance unit
21: first inspection unit
22: second inspection unit
31, 31a, 31b: first inspection part as inspection unit
32: second inspection part as inspection unit
V1: first conveyance speed
V2: second conveyance speed
V3: third conveyance speed
P: print sheet as inspection object

What is claimed is:

1. An image inspection apparatus comprising:
a downstream-side second conveyance unit that conveys a sheet-type inspection object, conveyed at a first conveyance speed with an upstream-side first conveyance unit, at a second conveyance speed; and
an inspection unit that inspects an image formed on the inspection object conveyed with the second conveyance unit,
wherein the inspection unit is provided at a position to start inspection of the image when the downstream-side second conveyance unit and the upstream-side first conveyance unit both contact and convey the sheet-type inspection object at the same time, and when a conveyance speed of the inspection object has changed to the second conveyance speed.

2. The image inspection apparatus according to claim 1, wherein the inspection unit is provided downstream from a position of a front end of the inspection object when a holding force to determine the conveyance speed of the inspection object is applied with the downstream-side second conveyance unit, so that a start of inspection of the image on the inspection object with the inspection unit occurs after a change of the conveyance speed of the inspection object to the second conveyance speed by an operation of the holding force of the second conveyance unit.

3. The image inspection apparatus according to claim 2, wherein the upstream-side first conveyance unit and the downstream-side second conveyance unit are respectively a suction conveyance unit that sucks and conveys the inspection object, and
wherein the inspection object is a member of a set of inspection objects, the member of which having the longest length being a reference inspection object whose length is used to determine the location of the inspection unit, and the inspection unit is provided at a position downstream of an intermediate position between the upstream-side first conveyance unit and the downstream-side second conveyance unit by a length longer than a half of the length of the reference inspection object.

4. The image inspection apparatus according to claim 1, wherein the inspection object is a member of a set of inspection objects, the member of which having the longest length being a reference inspection object whose length is used to determine the location of the inspection unit, and an interval between a downstream end of the upstream-side first conveyance unit and the inspection unit is longer than the length of the reference inspection object.

5. The image inspection apparatus according to claim 1,
wherein the inspection unit includes a first inspection part having relatively high reading accuracy and a second inspection part having relatively low reading accuracy, lower than the reading accuracy of the first inspection part, and
wherein the first inspection part is provided in a position to start inspection of the image when the conveyance speed of the inspection object has changed to the second conveyance speed.

6. The image inspection apparatus according to claim 1,
wherein the inspection unit includes at least two first inspection parts having relatively high reading accuracy, and
wherein, of the at least two first inspection parts, the first inspection part to read an image which requires high accuracy reading is provided in a position to start inspection of the image when the conveyance speed of the inspection object has changed to the second conveyance speed.

7. The image inspection apparatus according to claim 1,
wherein the first conveyance speed and the second conveyance speed are controlled so as to be substantially the same,
wherein the inspection unit is set so as to read the image in synchronization with the start of the second conveyance speed of the second conveyance unit, and
wherein the position of the inspection unit is such that the inspection by the inspection unit is properly performed even when the first conveyance speed and the second conveyance speed are not substantially the same.

* * * * *